(12) United States Patent
Ginn

(10) Patent No.: US 10,053,840 B2
(45) Date of Patent: Aug. 21, 2018

(54) MODULE FOR ARCHITECTURAL CISTERN SYSTEM

(71) Applicant: Jeffrey Steven Ginn, Atlanta, GA (US)

(72) Inventor: Jeffrey Steven Ginn, Atlanta, GA (US)

( * ) Notice: Subject to any disclaimer, the term of this patent is extended or adjusted under 35 U.S.C. 154(b) by 0 days.

(21) Appl. No.: 14/612,982

(22) Filed: Feb. 3, 2015

(65) Prior Publication Data
US 2015/0217899 A1 Aug. 6, 2015

Related U.S. Application Data

(60) Provisional application No. 61/936,451, filed on Feb. 6, 2014.

(51) Int. Cl.
*E03B 3/03* (2006.01)

(52) U.S. Cl.
CPC ....................... *E03B 3/03* (2013.01)

(58) Field of Classification Search
CPC ....................................................... E03B 3/03
USPC .... 220/23.4, 4.12, 4.16, 4.13; 137/884, 255, 137/571, 576
See application file for complete search history.

(56) References Cited

U.S. PATENT DOCUMENTS

| | | | | |
|---|---|---|---|---|
| 3,194,426 A | * | 7/1965 | Brown, Jr. | ......... B65D 21/0204 220/23.4 |
| 6,526,699 B1 | * | 3/2003 | Foglio, Sr. | ................ E03B 3/03 137/343 |
| 7,278,550 B2 | * | 10/2007 | Bezema | .................... B05C 5/02 137/884 |
| 8,474,195 B1 | * | 7/2013 | Anchondo | ................ E03B 3/03 405/284 |
| 9,279,271 B2 | * | 3/2016 | McDowell | .............. E04H 17/00 |

* cited by examiner

*Primary Examiner* — Stephen Castellano
(74) *Attorney, Agent, or Firm* — Yuri L. Eliezer; Bekiares Eliezer LLP

(57) ABSTRACT

A Modular Architectural Cistern (MAC) may be provided. The cistern may be embodied as slim, vertically ribbed structure. The interior of the structure may be configured to receive, store, and output rainwater. The cistern may comprise slip-fit connection joints configured to allow a plurality of connections to other MACs. Connections with other MACs may increase the rainwater storage volume available to the MAC. Moreover, the MAC may be aesthetically designed so as to accompany various architectural structures without taking away from the aesthetic appeal of the structure.

12 Claims, 11 Drawing Sheets

MODULE FOR ARCHITECTURAL CISTERN SYSTEM

RELATED APPLICATION

Under provisions of 35 U.S.C. § 119(e), the Applicant claims the benefit of U.S. provisional application No. 61/936,451, filed Feb. 6, 2014, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to water accumulation and storage.

BACKGROUND

In some situations, run-off water from a surface, such as a roof, may be collected for non-potable uses. These uses may include, but not be limited to, for example, irrigation, toilet flushing, cleaning and car-washing. An individual may collect rainwater and use it to water his lawn when, for example, there is a lawn-watering ban due to a drought.

The conventional strategy is to collect water in a rain barrel. This often causes problems because the conventional strategy may be unattractive and does not easily allow varying amounts of storage volume. For example, if an individual finds that he needs more storage space than one rain barrel, he must add a second storage barrel, which may be bulky and unsightly, and then formulate a way to connect the two rain barrels.

BRIEF OVERVIEW

A modular architectural cistern may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A Modular Architectural Cistern (MAC) may be provided. The cistern may be embodied as slim, vertically ribbed structure. The interior of the structure may be configured to receive, store, and output rainwater. The cistern may comprise slip-fit connection joints configured to allow a plurality of connections to other MACs. Connections with other MACs may increase the rainwater storage volume available to the MAC. Moreover, the MAC may be aesthetically designed so as to accompany various architectural structures without taking away from the aesthetic appeal of the structure.

Further, the cistern may be configured to receive rain water from, for example, a gutter downspout. Embodiments of the cistern may comprise gaskets for sealing joints. Further, embodiments may be configured to mate ancillary equipment for use of the stored water. Embodiments may further comprise plugs to prevent water escape from the ports enabling water transfer between cisterns or to ancillary equipment. Such plugs may be removed to enable drainage.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
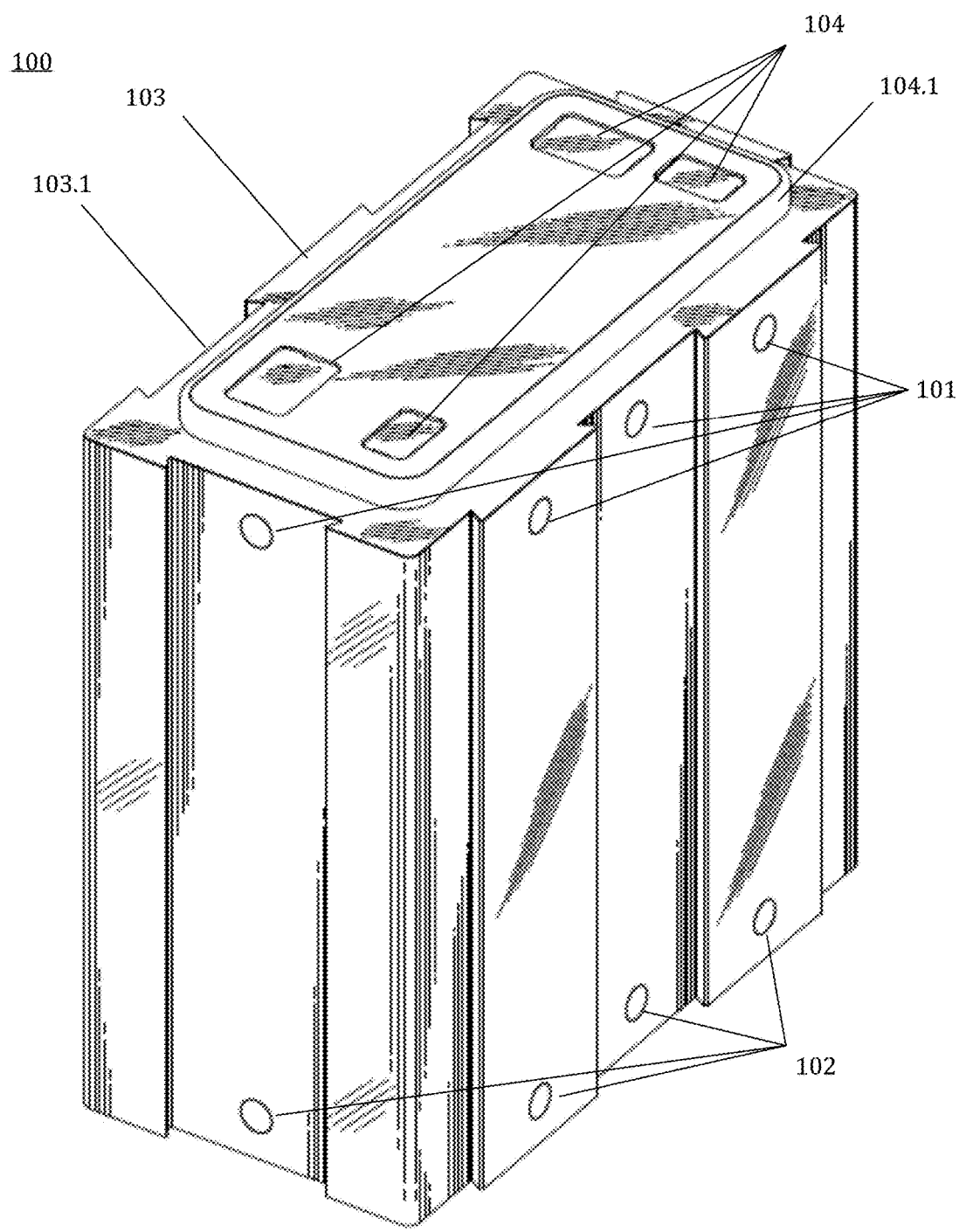
FIG. 1 illustrates an isometric view of an embodiment of a single Module.
Figure 2:
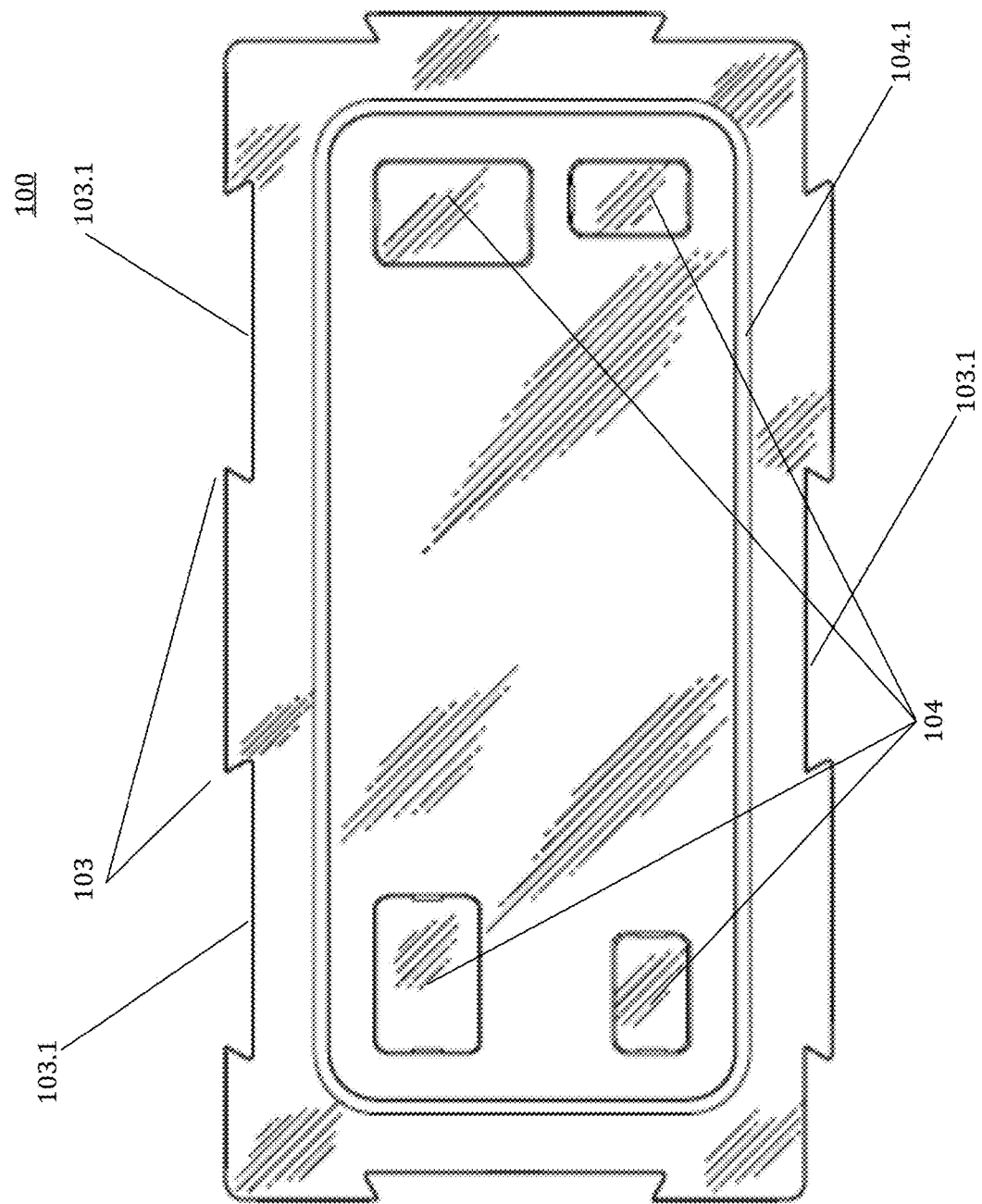
FIG. 2 illustrates a top view of an embodiment of a single Module.
Figure 3:
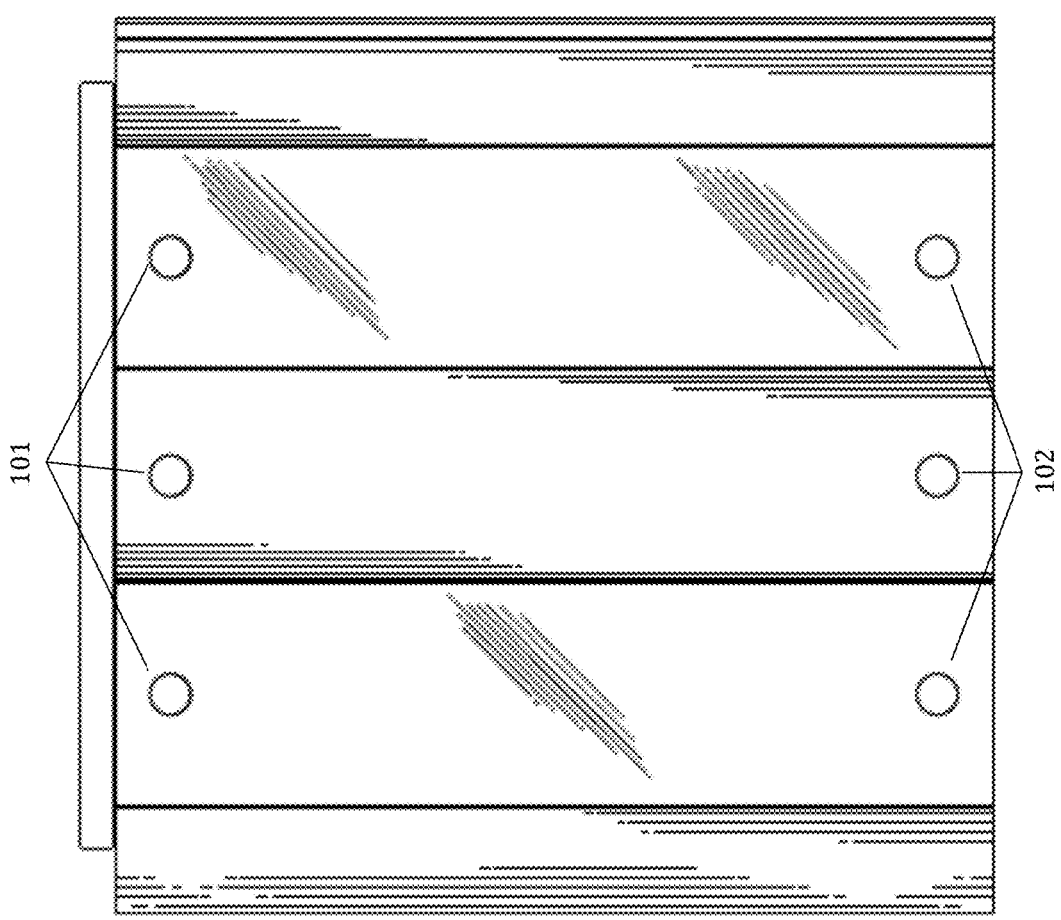
FIG. 3 illustrates a side view of an embodiment of a single Module.
Figure 4:
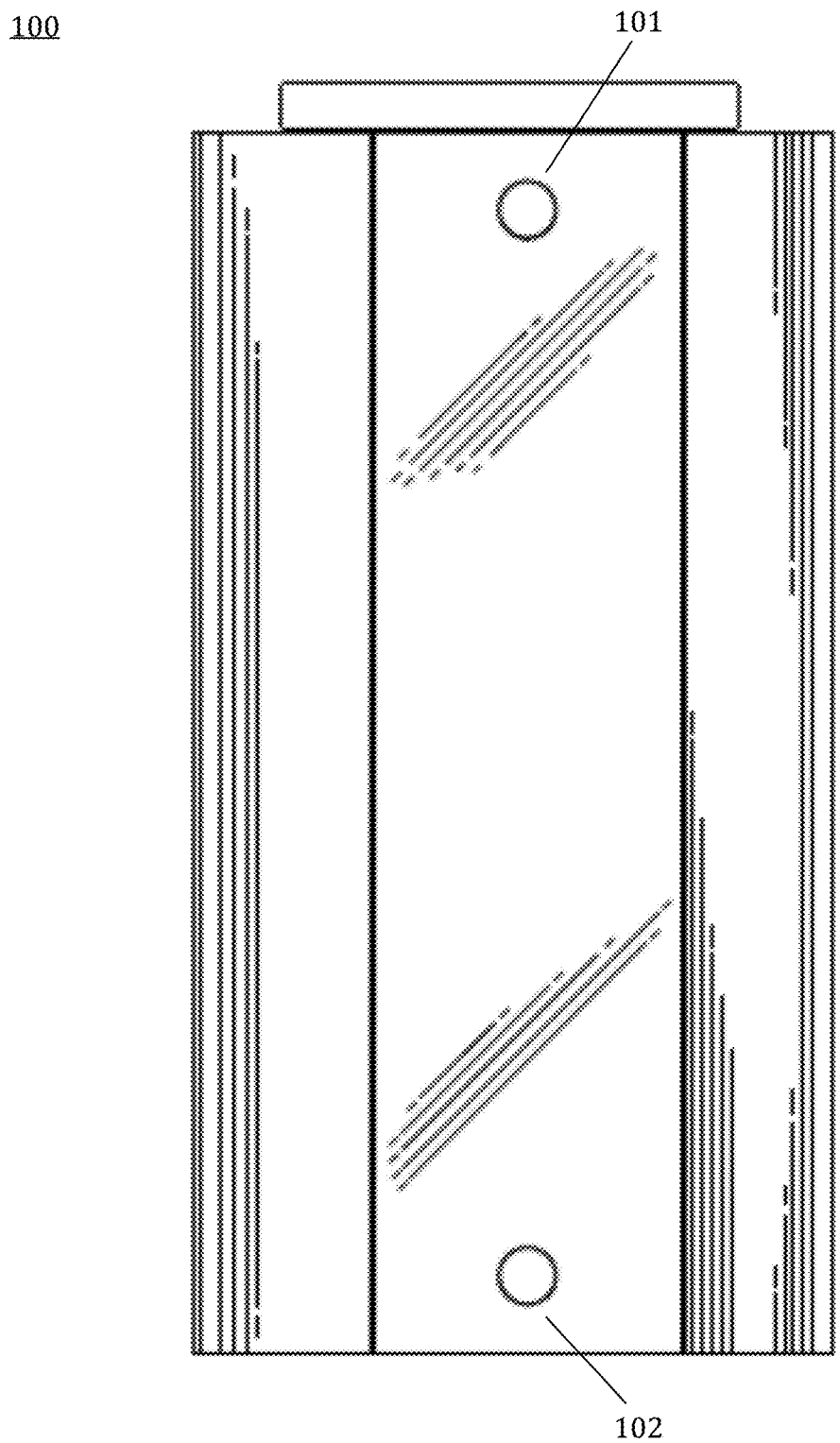
FIG. 4 illustrates another side view of an embodiment of a single Module.
Figure 5:
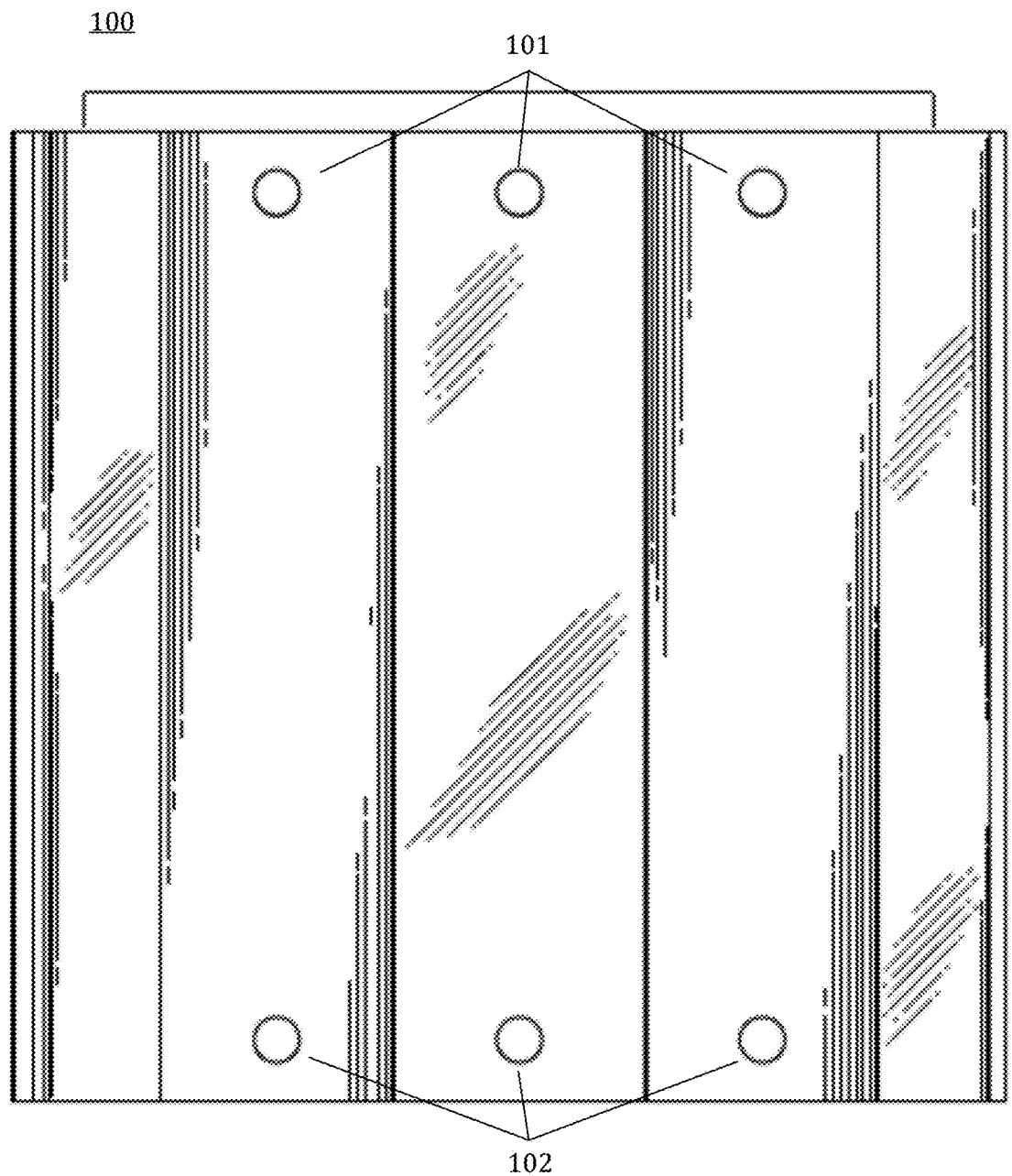
FIG. 5 illustrates yet another side view of an embodiment of a single Module.
Figure 6:
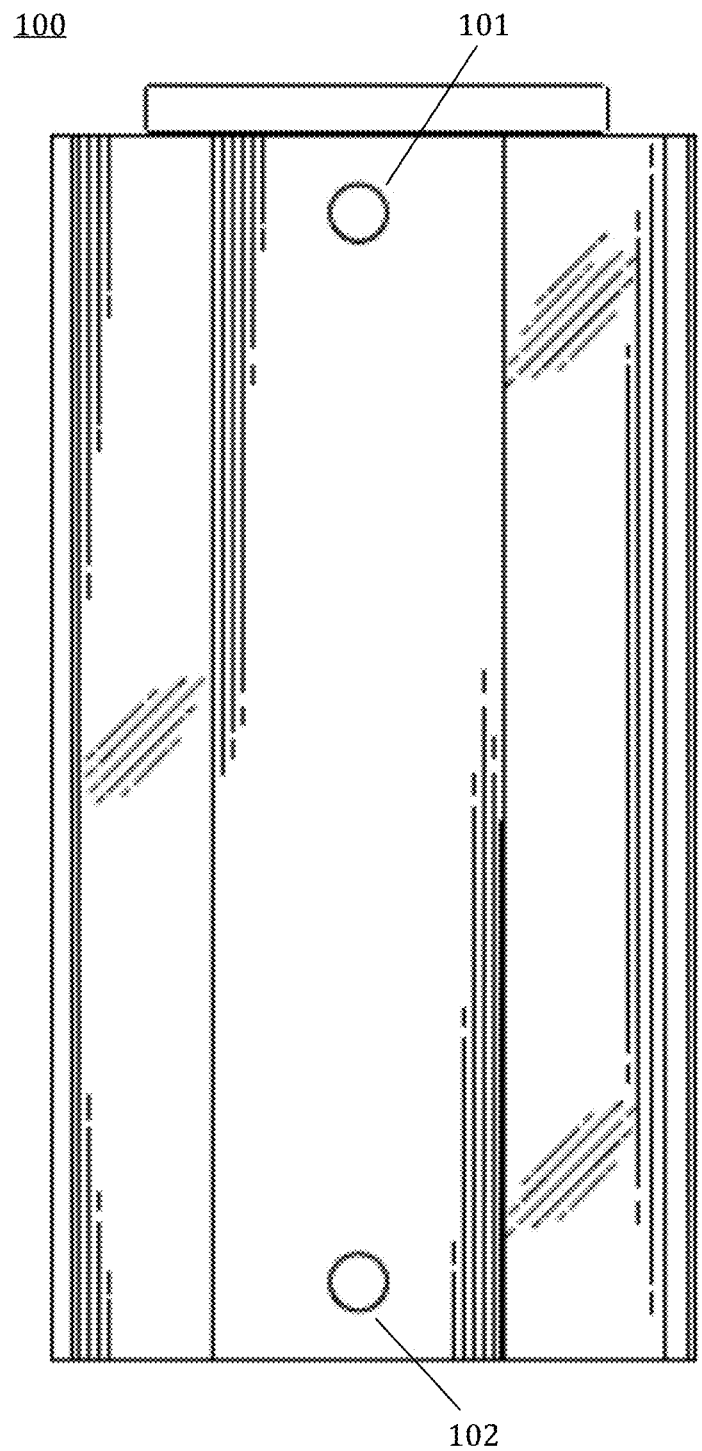
FIG. 6 illustrates still another side view of an embodiment of a single Module.
Figure 7:
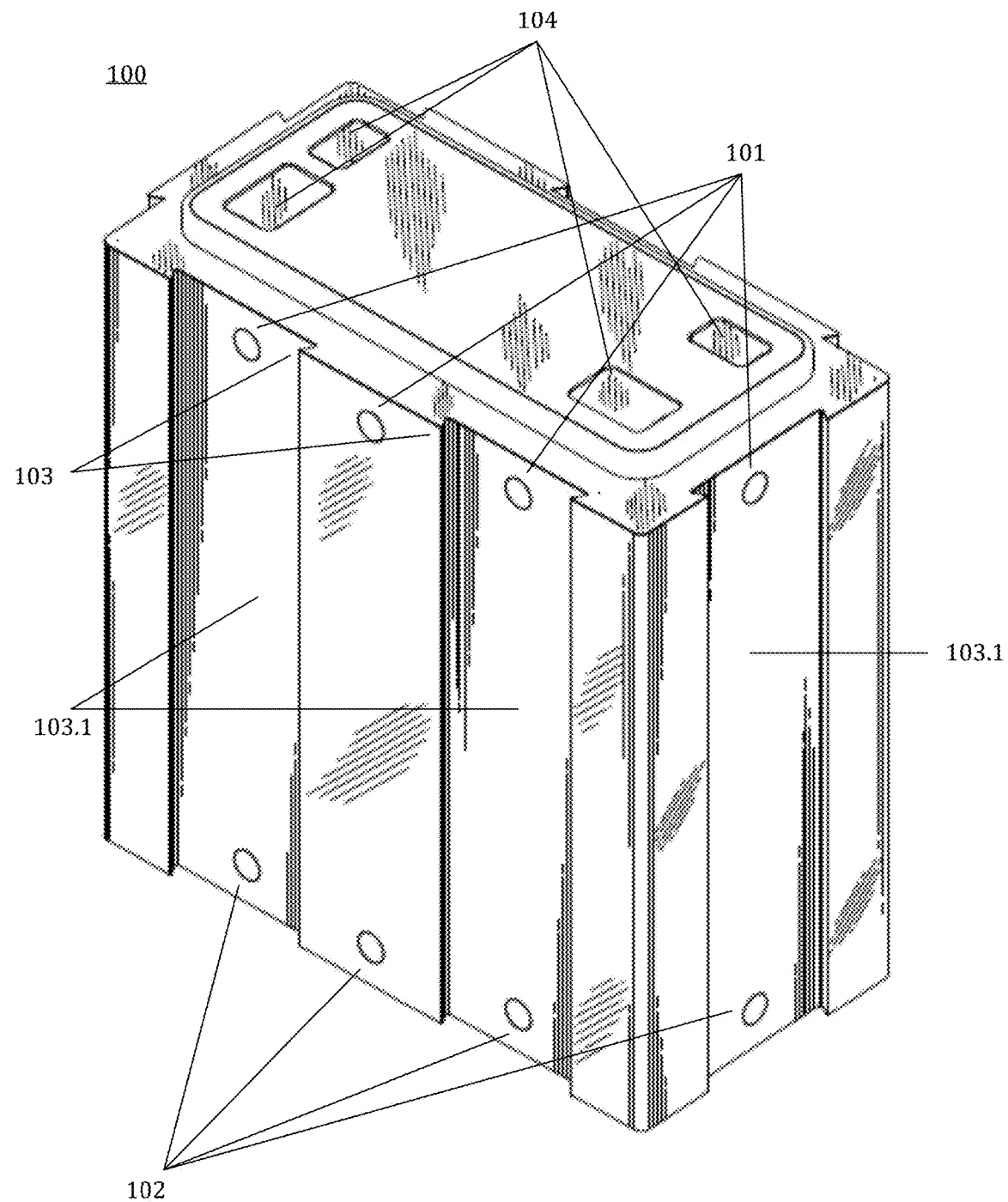
FIG. 7 illustrates another isometric view of an embodiment of a single Module.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Consistent with embodiments of the present disclosure, a Modular Architectural Cistern may be provided. The Modular Architectural Cistern (MAC) is a self-standing rectangular above-ground rainwater collection tank designed to architectural masonry standards. The MAC allows home owners to easily collect storm water runoff from their roofs to be used for non-potable uses. In some embodiments, the MAC may be configured to capture, for example, 66 gallons of roof run-off for non-potable uses.

Each module is designed to satisfy architectural masonry standards so that it fits within existing masonry conditions or needs to be built-in to satisfy building standards. The MAC may utilize a one-piece vertical corrugated design built of injection-molded formed polymer that provides structure to prevent damage to the cistern from the pressure of the water. The design may comprise a body configured to receive, store, and transfer water. In some embodiments, the water pressure may equal approximately 1.1 pounds per square inch, enabling the module to hold approximately 547.8 pounds of water.

The configuration, position, width and depth of these structural ribs enable the MAC to be combined with other modules in a slip-fit configuration. The design utilizes an interlocking male/female rib design that allows for multiple Modules to be connected in various orientations to allow for variable storage capacity in an aesthetically pleasing manner. It should be understood that the terms male/female rib design or structure are as just some possible descriptive terms for the modular cistern depicted in the figures. The male/female rib terminology may also be described as an interlocking rib and groove system, and such descriptions may be used interchangeably throughout the specification. In addition, the Modules allow for easy attachment to pumps, hoses and other ancillary equipment.

In some embodiments, up to six additional modules may be connected to each other horizontally with eight potential connection positions. Each Module added to the combination may increase the possible connection positions. This, in turn, creates greater flexibility for the end user allowing them to design a functioning architectural statement that harvests the desired quantity of rainwater while adding visual value to their property.

FIGS. 1-7 illustrate a MAC 100 consistent with embodiments of the disclosure. Interlocking ribs 103 and interlocking grooves or channels 103.1 illustrate one embodiment of a rib method consistent with embodiments of the present disclosure. The Modular Architectural Cistern may comprise a port at the top of a module and a port at the bottom of a module that are designed to mate. The connection established may allow water to transfer between adjacent modules without leaking. The top and bottom ports 104 may be left open so that water can transfer through, or the ports may be plugged to prevent water from transferring through.

Embodiments of the present disclosure may have one or more ports on the sides of the module, represented by labels 101 and 102. Ports may be straight holes, or they may incorporate threads such as National Pipe Thread (NPT) or Unified Threads, or any other methods for attaching ancillary fittings and equipment. Side ports near the top of the module may be overflow ports 101; ports at the bottom of the module may be connection/drainage ports 102. The connection/drainage ports 102 may be at an approximately uniform height so that water may transfer between adjacent modules; the overflow ports 101 may be at an approximately uniform height so that water may transfer between adjacent modules.

The Modular Architectural Cistern may be made using plastic-forming methods, for example, injection molding. Gaskets may be incorporated into embodiments of this disclosure to minimize water leaking. In addition, ports may be reinforced with other materials. Further, each Module may include assorted plugs and/or fittings to attach to and utilize the ports.

Consistent with embodiments of the present disclosure, the MAC may be provided in a plurality different dimensions. The follow specification reflects one possible set of embodiments and is not intended to exclude any variations thereof:

Exterior Dimensions: 32"H×32"W×16"D;
Interior Dimensions: 31.5"×31.5"W×15.5"D;
Walls: One Piece ¼ inch gauged (may be formed from recycled polymer and may be Food-Grade Virgin Polyethylene that doesn't contain BPA);
Standard Plumbing connections for 10 possible module connection points and 10 possible overflow ports;
Corrugated formed ribs provide vertical Structure to avoid bulging under high water pressure;
Formed ribs may also be used as slip-fit connection points to attach multiple units in up to 10 positions;
Slip-Fit connections may also provide attachment points for add-on finishes and additional structure when stacking units; and
Top connect points may provide attachment points for potted plant trays.

Still consistent with embodiments of the present disclosure, a module may be fabricated of one-piece injection-molded formed polymer of a material thickness designed to be lightweight yet structurally sound and easy for one individual of any age to lift it and place into the desired position. The vertical male/female rib structure may provide eight possible connection points allowing a maximum of six modules to be added horizontally to each module. Each male/female rib may include one Connection/Drain Port and one Overflow Port. The top and bottom of each Module may utilize large male protrusions 104.1/female recessions to allow for easy cleaning and stacking of units to three high. Standard Plumbing Connections may include, for example, but not be limited to:

8 Pop-out Connection/Drain Ports;
8 Pop-out Overflow Ports; and
4 Down Spout Connection Ports.

Figure 8:
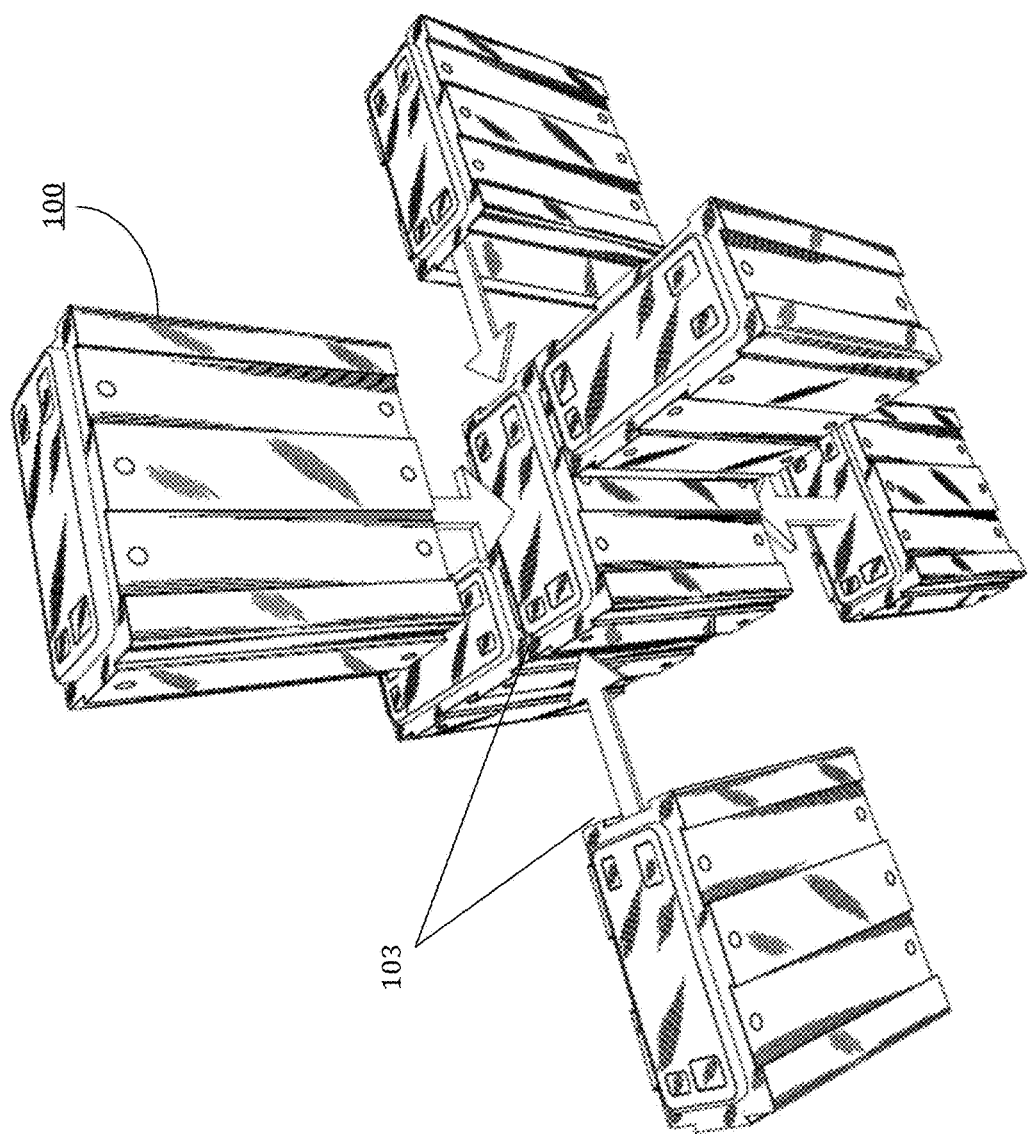
FIG. 8 illustrates how an embodiment of multiple Modules may be combined.
Figure 9:
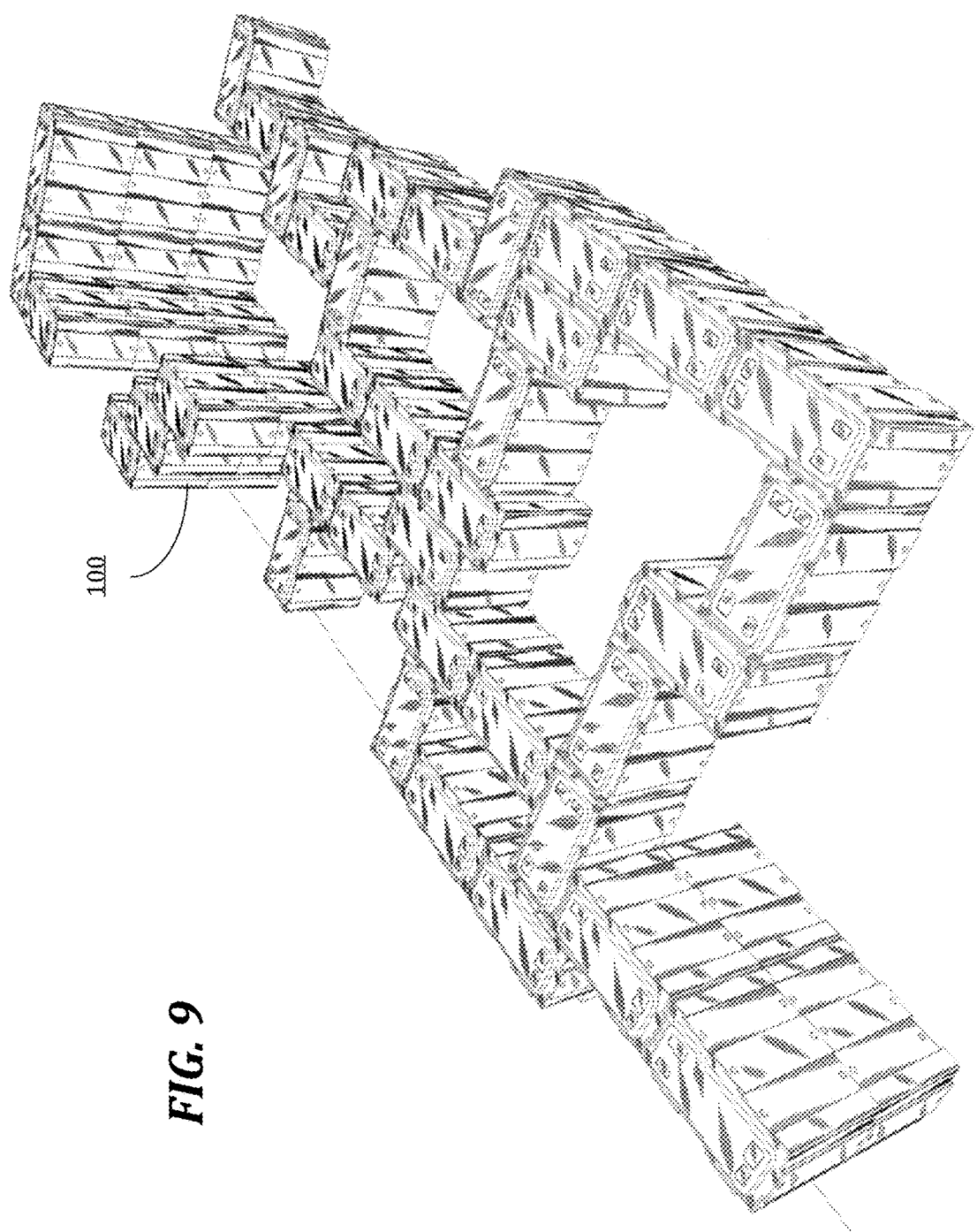
FIG. 9 illustrates an embodiment utilizing multiple connected Modules.
Figure 10:
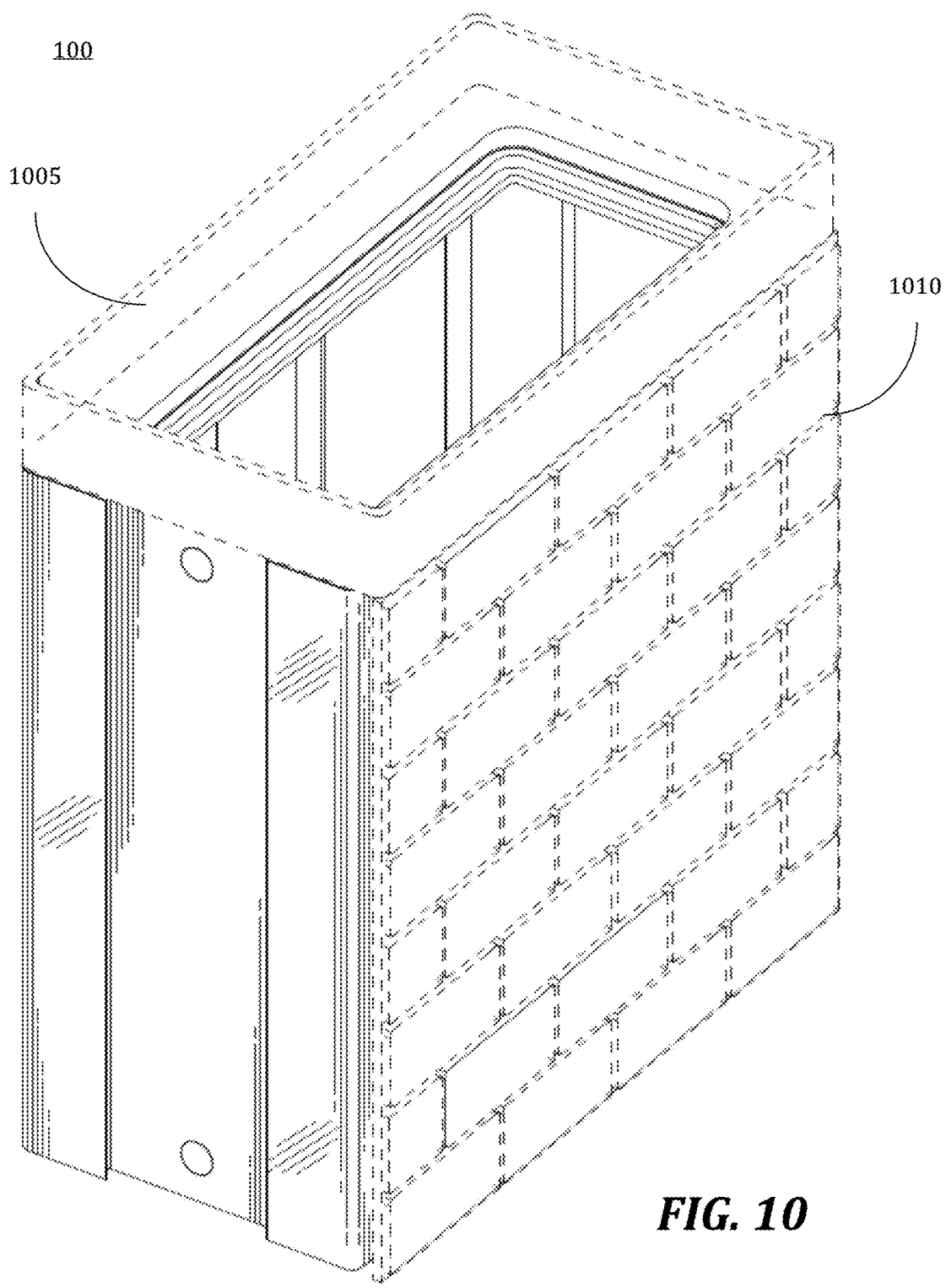
FIG. 10 illustrates an embodiment of a Module comprising an optional features.
Figure 11:
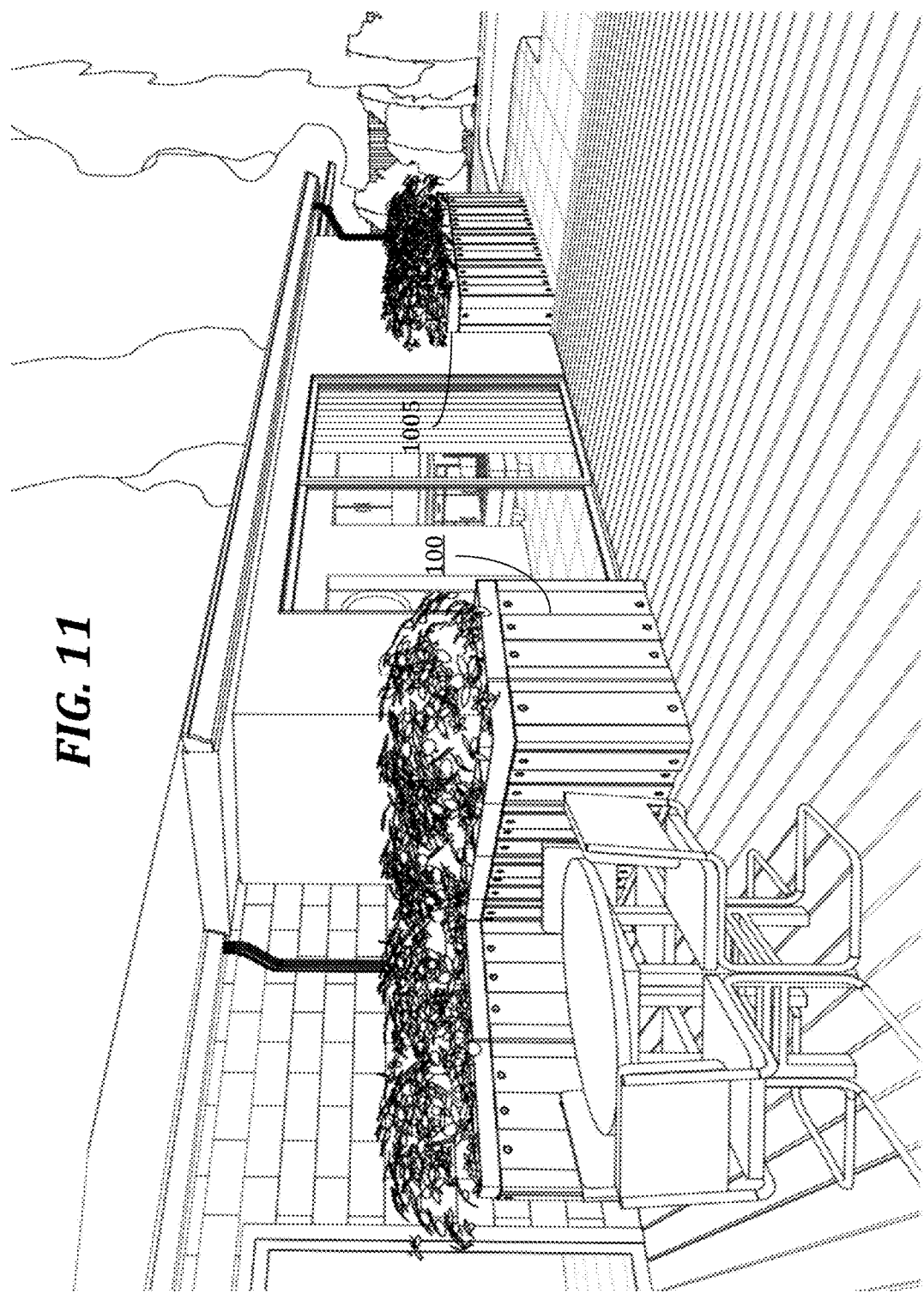
FIG. 11 illustrates Modules as applied to a dwelling.

Consistent with an embodiment of the disclosure, the one or more modules of the Modular Architectural Cistern may attach to a gutter spout to collect the roof run-off. FIGS. 8-9 illustrate some examples of how multiple modules may be arranged to mate together. As detailed above, the ports on the modules may mate with the ports on adjacent modules. In this way, water may transfer between adjacent modules. FIG. 10. Illustrates optional features that may be added to the MAC. For example, the MAC may be configured to have a tray for plants placed on an upper portion of the MAC. In addition, the MAC may be configured so as to receive overlays on its exterior portion. The overlays may be, for example, textured tiles or weather resistant materials to improve the aesthetic appearance of the MAC. FIG. 11 illustrates how a plurality of Modules may be configured to a residential dwelling. It should be understood that many other configurations are possible, and that the Modules may be configured independently or with any type of architectural structure.

Overflow ports that do not mate with adjacent Modules may be plugged to prevent leaking, for example, if there are two Modules stacked vertically. In another embodiment, the overflow ports may be left open to prevent water from backing up. In yet another embodiment, the overflow ports may connect to ancillary equipment, for example, a hose that drains into another location.

Connection/drainage ports that do not mate with adjacent Modules may connect to ancillary equipment, for example, a pump that connects to a hose for watering a lawn or a toilet supply line. The unused ports may also be plugged to hold in captured water.

All rights including trademarks, trade dress, product configurations, and copyrights included herein are vested in and the property of the Applicant. The Applicant retains and reserves all rights in the drawings and designs included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A module for a modular cistern system, the module comprising:
    a pair of opposing side walls;
    a pair of opposing end walls;
    a top wall; and
    a bottom wall;
    said opposing side walls, opposing end walls, top wall, and bottom wall being configured to define an interior and an exterior,
    wherein the interior is configured to receive, store and output water,
    wherein the exterior comprises connection structures, said connection structures include female channels and male ribs,
    wherein each channel and rib is configured to interlock with a corresponding rib and channel, respectively, of another module to form a slip-fit, interlocked connection joint which locks the two interconnected modules with a detachable connection,
    wherein each of said side wall and said end wall includes at least one of said connection structures,
    wherein each side wall includes at least two connection structures arranged in an alternating pattern that alternates channels and ribs,
    wherein each channel and rib include at least one hole configured to align with a corresponding hole on the rib and channel, respectively, of the other module when the two modules are interconnected to enable water to flow between the interiors of the two interconnected modules through a watertight connection.

2. The module of claim 1, wherein the slip-fit, interlocked connection joint is configured to enable eight possible configurations to other modular cisterns.

3. The module of claim 2, wherein the slip-fit, interlocked connection joint is configured to provide eight horizontal connection points and two vertical connection points.

4. The module of claim 3, wherein the configurations of the slip-fit, interlocked connection joint with other modules are configurable so as to transfer water from a first module to a second module connected to the first module via at least one of the eight horizontal connection points and the two vertical connection points.

5. The module of claim 1, wherein the slip-fit, interlocked connection joint is configured to connect to ancillary equipment.

6. The module of claim 1, wherein the slip-fit, interlocked connection joint is reinforced.

7. The module of claim 1, wherein at least one of the slip-fit, interlocked connection joints is plugged to prevent water leakage.

8. The module of claim 1, wherein the module is comprised of an injection-molded polymer.

9. The module of claim 8, wherein the polymer is BPA-free and comprised of recycled material.

10. The module of claim 1, further comprising a port for receiving water and a port for outputting water.

11. The module of claim 10, wherein the port for receiving water is configured to connect to a gutter spout.

12. The module of claim 10, wherein the port for outputting water is configured to connect to a hose.

* * * * *